United States Patent [19]
Bristol

[11] Patent Number: 4,538,887
[45] Date of Patent: Sep. 3, 1985

[54] ASPHERIC SPECTACLE LENS BLANK

[76] Inventor: Alexander C. Bristol, 5480 SW. 85 St., Miami, Fla. 33143

[21] Appl. No.: 587,618

[22] Filed: Mar. 8, 1984

[51] Int. Cl.³ .......................... G02B 3/04; G02C 7/02
[52] U.S. Cl. ..................................... 351/167; 350/432
[58] Field of Search ............... 351/167, 159; 350/432, 350/433–435

[56] References Cited

U.S. PATENT DOCUMENTS

| | | | |
|---|---|---|---|
| 4,181,409 | 1/1980 | Whitney et al. | 351/167 |
| 4,185,897 | 1/1980 | Frieder | 351/167 |

Primary Examiner—John K. Corbin
Assistant Examiner—Scott J. Sugarman
Attorney, Agent, or Firm—Gifford, VanOphem, Sheridan, Sprinkle & Nabozny

[57] ABSTRACT

The present invention provides a spectacle lens blank for an aphakic eye and which is adapted to be positioned at a predetermined position in front of the eye. The lens blank includes a lens body having a posterior surface and an anterior surface. The anterior surface is aspherical from its center and to its outer periphery and the radius of curvature of the anterior surface is formed with a variable diopter gradient which is proportional to the distance between the eye and the anterior surface when the lens blank is at its predetermined position. Preferably, the lens power decreases six diopters from the center and to the outer periphery of the lens blank. In use, the lens blank of the present invention provides a wide field of central and peripheral vision for a person following extra-capsular surgery.

2 Claims, 2 Drawing Figures

ASPHERIC SPECTACLE LENS BLANK

BACKGROUND OF THE INVENTION

I. Field of the Invention

The present invention relates to an aspheric spectacle lens blank for a person following extra capsular surgery.

II. Description of the Prior Art

There are many types of previously known lenses particularly designed for aphakia patients. In one type of previously known spectacle lens, the lens comprises a curvalinear anterior surface having aspherically shaped central vision surface area and an aspherical peripheral area surrounding the central area. The aspherical surface area is formed with a variable gradient which decreases the power of the lens from the central area and to the outer periphery of the lens.

Typically, the aspherical diopter rate of change has been approximately one-third diopter per millimeter across the lens peripheral area which provides a lens power decrease of about four diopters from the center and to the periphery of the lens blank. In practice, this previously known lens improves the peripheral vision of the person suffering from aphakia when looking through the central vision portion. In order to use this previously known lens effectively, however, it was necessary for the patient to turn his or her head rather than his or her eyes in order to more clearly observe objects.

A primary disadvantage of this previously known type of lens, however, is that it is difficult for many patients to learn to focus on objects by turning their heads rather than their eyes as they have done in the past.

SUMMARY OF THE PRESENT INVENTION

The present invention provides a spectacle for aphakia patients which overcomes the previously known disadvantages of the prior art.

In brief, the lens blank of the present invention is generally circular in shape and comprises a posterior surface and a curvilinear anterior surface. The entire anterior surface is aspherical from its center to its outer periphery. This aspherical anterior surface is formed so that the radius of curvature of the anterior chamber is proportional to the distance between the eye and the anterior surface when the lens is worn in the normal fashion.

Thus, unlike the previously known lenses, the lens of the present invention provides two different areas of asphericity, namely the intermediate area and the extreme peripheral area. In practice, the rate of diopter curvature at the extreme peripheral area of the lens blank drops off at about twice the rate as the intermediate area. These two aspheric areas blend together without any visible zones.

The lens power decreases approximately six diopters from the center and to the outer periphery of the lens which has been found to improve the patient's peripheral vision. In use, the lens of the present invention, when used by aphakia patients provides a wide range of vision and allows the patient to move his or her eyes and still obtain both good central and peripheral vision.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which.

DETAILED DESCRIPTION OF PREFERRED EMBODIMENTS OF THE INVENTION

Figure 1:
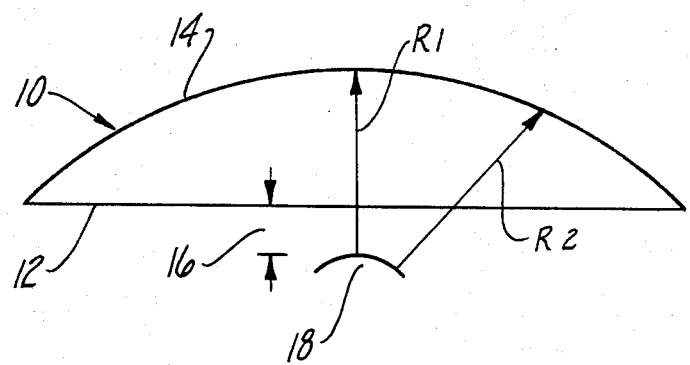
FIG. 1 is a side view illustrating a preferred embodiment of the spectacle lens for aphakia patients of the present invention.

With reference first to FIG. 1 a preferred embodiment of the lens blank for aphakia patients is thereshown and comprises a lens body 10 constructed of a transparent material. Typically the lens body 10 is molded from transparent plastic or glass.

The lens body 10 includes a generally planar posterior surface 12 and a curvalinear anterior surface 14. As is well known, the lens body 10 is adapted to be positioned a predetermined distance 16 in front of a human eye 18.

Figure 2:
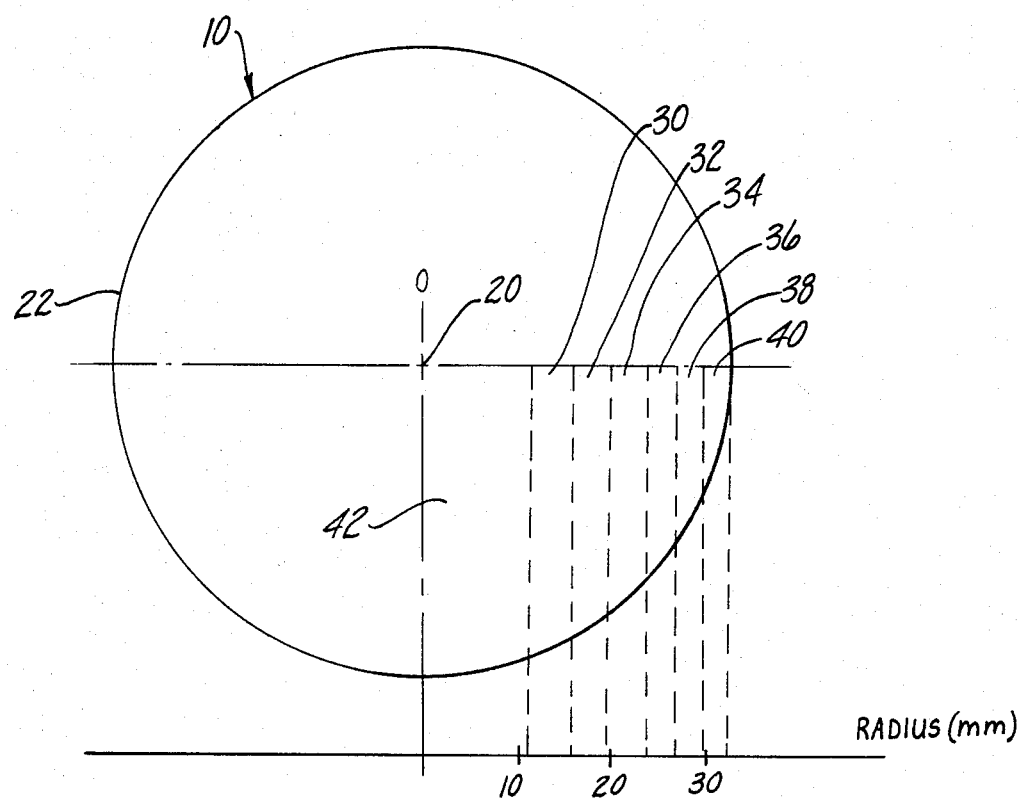
FIG. 2 has a front diagrammatic view of the preferred embodiment of the spectacle lens for aphakia patients.

Referring to FIGS. 1 and 2, the lens body 10 includes a geometric and optical center 20 and a generally circular outer periphery 22. As best shown in FIG. 1, the entire anterior surface 14 is aspherical from its center 20 and to its outer periphery 22. Furthermore, the radius of curvature, e.g. R1 and R2, of the anterior surface 14 is proportional to the distance between the eye 18 and the anterior surface 14.

The diopter curvature at the center 20 of the lens body 10 is in the range of 10 to 20 diopters. The radius of curvature of the anterior surface 14 diminishes from the center 20 and toward the outer periphery 22 of the lens blank in the fashion described above so that the rate of power drop at the outer periphery of the lens body 10 is substantially double the rate of power drop at the center of the lens. Consequently, the lens of the present invention provides two different areas of asphericity, namely the intermediate area and the extreme peripheral area. These two aspheric areas blend together without any visible zones between them.

With reference now to FIG. 2, the lens body 10 is divided into six zones 30, 32, 34, 36, 38 and 40 in addition to the center zone 42. For a conventional 65 millimeter lens blank, the power and diameter of each zone is shown in the following table:

| Zone Number | Diameter (mm) | Power (diopters) |
| --- | --- | --- |
| 42 | 23 ± 2 | C |
| 30 | 32 ± 2 | C - 0.50 |
| 32 | 40 ± 2 | C - 1.00 |
| 34 | 47 ± 2 | C - 1.50 |
| 36 | 53.5 ± 2 | C - 2.50 |
| 38 | 59.5 ± 2 | C - 3.50 |
| 40 | 65 ± 2 | C - 4.50 | where C equals the lens power in diopters of the optical center 20. The value of C typically ranges between ten and twenty diopters.

From the above table, it can be seen that the lens power diminishes approximately 0.50 diopter/zone for the center zone 42 and first three zones 30, 32 and 34. Conversely, the lens power diminishes at the rate of approximately 1.00 diopters/zone for the outer three zones 36, 38 and 40, thus producing the desired two areas of asphericity. It has been found that these two areas of asphericity together with an approximately six diopter lens power decrease from the lens center 20 and to the outer periphery 22 provide improved central and peripheral vision for aphakia patients.

The lens blank of the present invention provides both good central and good peripheral vision for aphakia patients both through the central portion of the lens as well as the peripheral lens portion when the patient turns his or her eyes. The lens body 10 is also preferably manufactured with an ultra violet absorbing chemical which absorbs ultra violet rays up through 390 nanometers in order to minimize the ultra violet sensitivity common to aphakia patients. Such ultra violet absorbent chemicals are well known in the art.

From the foregoing, it can be seen that the present invention provides an improved lens for aphakia patients which provides both good central and peripheral vision even though the eyes are directed through the peripheral portion of the lens.

Having described my invention, however, many modifications thereto will become apparent to those skilled in the art to which it pertains without deviation from the spirit of the invention as defined by the scope of the appended claims

I claim:

1. A lens blank for an aphakic eye comprising:
    a generally circular lens blank having posterior surface and an aspherical anterior surface with an optical center, said anterior surface having a circular central zone encircled by six concentric zones formed in accordance with the following table:

| Zone Number | Diameter (mm) | Power (diopters) |
|---|---|---|
| Central zone | 23 ± 2 | C |
| First zone | 32 ± 2 | C - 0.50 |
| Second zone | 40 ± 2 | C - 1.00 |
| Third zone | 47 ± 2 | C - 1.50 |
| Fourth zone | 53.5 ± 2 | C - 2.50 |
| Fifth zone | 59.5 ± 2 | C - 3.50 |
| Sixth zone | 65 ± 2 | C - 4.50 | where C equals the lens power at said optical center.

2. The invention as defined in claim 1 wherein C is in the range of 10–20 diopters.

* * * * *